United States Patent
Giebeler et al.

(12) 
(10) Patent No.: US 6,417,285 B2
(45) Date of Patent: Jul. 9, 2002

(54) METHOD FOR THE PRODUCTION OF A COPOLYMER BASED ON VINYL AROMATIC COMPOUNDS AND CONJUGATED DIENES

(75) Inventors: Ellen Giebeler, Köln; Heinz-Dieter Brandt, Willich; Rüdiger Engehausen, Dormagen; Günter Marwede, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/764,671

(22) Filed: Jan. 18, 2001

(30) Foreign Application Priority Data

Jan. 28, 2000 (DE) .......................................... 100 03 743

(51) Int. Cl.$^7$ ................................ C08F 8/34; C08F 8/32
(52) U.S. Cl. ................................ 525/332.4; 525/332.6; 525/332.7; 525/346
(58) Field of Search .......................... 525/332.4, 332.6, 525/346, 332.7

(56) References Cited

U.S. PATENT DOCUMENTS

| | | | |
|---|---|---|---|
| 3,373,132 A | 3/1968 | Sutter et al. ............... 260/33.6 |
| 3,374,191 A | 3/1968 | Nutzel ............................ 260/5 |
| 4,115,437 A | 9/1978 | Matsuda et al. ......... 260/513 R |
| 4,133,845 A | * 1/1979 | Beck et al. .................. 525/354 |
| 4,244,862 A | * 1/1981 | Handa et al. ............... 524/505 |
| 4,303,766 A | 12/1981 | O'Farrell et al. ........... 525/353 |
| 4,463,139 A | 7/1984 | Berger ...................... 525/329.1 |
| 4,647,625 A | 3/1987 | Aonuma et al. ............. 528/232 |
| 5,567,784 A | 10/1996 | Wieder et al. ............... 526/164 |
| 6,174,951 B1 | * 1/2001 | Scholl ........................ 524/492 |

FOREIGN PATENT DOCUMENTS

| | | |
|---|---|---|
| EP | 10323407 | 8/1998 |
| GB | 1512557 | 6/1978 |

OTHER PUBLICATIONS

Ullmanns Encyclopedia of Industrial Chemistry, 6th Edition, 2000, Electronic Release, 199, Wiley–VCH, Weinheim, notably in the chapters Rubber, 3. Synthetic, 2.1 Emulsion Styrene–Butadiene Rubber (E_SBR) and 3.1.1 Solution 1,3–Butadiene–Styrene Rubber (S–SBR) and Styrene–Isoprene–Butadiene Rubber (S–SIBR).

* cited by examiner

*Primary Examiner*—James J. Seidleck
*Assistant Examiner*—Olga Asinovsky
(74) *Attorney, Agent, or Firm*—Joseph C. Gil; Noland J. Cheung; Jennifer R. Seng

(57) ABSTRACT

The present invention provides a method for the production of a copolymer based on vinyl aromatic compounds and conjugated dienes, in which after polymerization, the copolymers are treated with multi-functional sulfur halides in the presence of a catalyst at temperatures in the range from 20 to 130° C.

The copolymers produced according to the present invention demonstrate clearly improved processing characteristics as a result of selective masticating effect and good mechanical properties.

10 Claims, No Drawings

METHOD FOR THE PRODUCTION OF A COPOLYMER BASED ON VINYL AROMATIC COMPOUNDS AND CONJUGATED DIENES

FIELD OF THE INVENTION

The present invention provides a method for the production of a copolymer based on vinyl aromatic compounds and conjugated dienes with low cold flow, improved processability and good mechanical properties.

BACKGROUND OF THE INVENTION

Methods for the production of rubber-elastic diene polymers, in which an improved cold flow is obtained by treating the diene polymers with specific sulfur halides, are known from DE-A 4,436,059 and DE-A 1,260,794. "Cold flow" refers to the property by which polymers deform under the influence of small but constant forces generated by their own weight. This property is particularly troublesome in terms of the storage of elastomers and involves considerable technical complexity and financial outlay.

The object of the present invention is to reduce cold flow in vinyl aromatic diene copolymers and in doing so, to improve the processability and mechanical properties of the diene copolymers at the same time.

SUMMARY OF THE INVENTION

Therefore, the present invention provides a method for the production of copolymers based on vinyl aromatic compounds and conjugated dienes, characterized in that after polymerization the copolymers are treated with multi-functional sulfur halides in the presence of a catalyst at temperatures in the range from 20 to 130° C.

DETAILED DESCRIPTION OF THE INVENTION

Examples of vinyl aromatic compounds that can be used to formulate the copolymers include: styrene, p-methyl styrene, α-methyl styrene, 3,5-dimethyl styrene, vinyl naphthalene, p-tert-butyl styrene, divinyl benzene and diphenyl ethylene.

1,3-butadiene, isoprene, 1,3-pentadiene, 2,3-dimethyl-1,3-butadiene, 1-phenyl-1,3-butadiene, 1,3-hexadiene and 1,3-heptadiene can be used as conjugated dienes in the method according to the present invention.

Such vinyl aromatic diene copolymers are known—as is their production by emulsion polymerization or anionic polymerization—and are described, for example, in Ullmann's Encyclopedia of Industrial Chemistry, 6th Edition, 1999 Electronic Release, 1999 Wiley-VCH, Weinheim, notably in the chapters "Rubber, 3. Synthetic, 2.1 Emulsion Styrene-Butadiene Rubber (E-SBR) and 3.1.1 Solution 1,3-Butadiene-Styrene Rubber (S-SBR) and Styrene-Isoprene-Butadiene Rubber (S-SIBR).

Emulsion polymerization is performed, as is known, by polymerization of the monomers thereby forming the copolymers in the presence of a radical initiator, e.g., a redox system, and a regulator, e.g., a dodecyl mercaptan, along with an emulsifier in an aqueous solvent and a short-stop reagent for short-stopping.

Accordingly, the anionic polymerization is performed in the presence of an alkali metal-based initiator, e.g., n-butyl lithium, in a hydrocarbon as solvent. Known randomizers, e.g., potassium alcoholates, and control agents for the polymer microstructure, e.g., ether or tert-amine, can additionally be used.

After polymerization of the vinyl aromatic diene copolymers, the copolymers are treated, according to the present invention, with multi-functional sulfur halides in the presence of a catalyst.

To this end, the sulfur halides can be mixed with the copolymers in a compounder or on a roll. A simpler method, however, particularly in the case of solution polymerization, is to meter the sulfur halides into the copolymer solution. This method can be performed especially, with ease and without the need for complex equipment, since such sulfur halides are soluble in the conventional polymerization solvents such as heptane, hexane, pentane, benzene, toluene and/or cyclohexane, and any sulfur halide that is not reacted, can be removed during the recovery process.

As mentioned above, the vinyl aromatic diene copolymers are treated with the multi-functional sulfur halides in the presence of a catalyst.

Suitable catalysts are Lewis acids, such as boron trifluoride, zinc dichloride, triethyl aluminum, aluminum trichloride, aluminum tribromide, tin tetrachloride and titanium tetrachloride, preferably aluminum trichloride, and tert-amines, such as, diisopropyl ethylamine, diazabicycloundecane and triethylamine.

Disulfur dichloride, sulfur dichloride, thionyl chloride, polysulfur dichloride, disulfur dibromide or polysulfur dibromide, preferably disulfur dichloride, can be used as multi-functional sulfur halides in the method according to the present invention.

The sulfur halides can be used either alone or combined as a mixture, as can the previously mentioned catalysts.

The multi-functional sulfur halides are generally used in the method according to the present invention in quantities of 0.005 to 5.0, preferably 0.01 to 0.5 wt. %, relative to the mass of the copolymer. The quantity of catalyst is generally from 0.05 to 5.0, preferably 0.1 to 2.0 wt. %, relative to the mass of the copolymer.

The method according to the present invention is preferably performed at temperatures in the range from 25 to 120° C. On completion of the treatment of the vinyl aromatic diene copolymers with the multi-functional sulfur halides, the vinyl aromatic diene copolymers are recovered by mixing the solution with a stabilizer, such as, 2,6-di-tert-butyl-4-methylphenol and Araldite® DY 026SP from BASF AG, and isolating the vinyl aromatic diene copolymer by feeding the solution into alcohol, such as ethanol or isopropanol, or boiling water.

What is particularly surprising about the method according to the present invention is that not only the cold flow but also the processability of the diene copolymers and the mechanical properties of the vulcanizates manufactured therefrom were able to be improved. The copolymers according to the present invention can thus, be used in the manufacture of all types of moldings, especially tire components such as side walls and treads.

Indeed, DE-A 1,260,794, which is referred to above, teaches that in the production of rubber-elastic diene polymers, their cold flow can be improved by treatment with sulfur halides without impairing their processability and without influencing the mechanical properties of the vulcanizates (see column 1, lines 25–30). However, it cannot be construed from the cited prior art that by appropriate treatment of vinyl aromatic diene copolymers with sulfur halides in the presence of a catalyst, not only the cold flow but also their processability and the mechanical properties of the vulcanizates manufactured therefrom can be improved. As has been outlined above, this is to be judged as surprising on the basis of the known prior art.

The invention is further illustrated but is not intended to be limited by the following examples in which all parts and percentages are by weight unless otherwise specified.

EXAMPLES

The content of styrene in the polymer and the selectivity of the polybutadiene (1,4-cis, 1,4-trans and 1,2 content) are determined by means of IR spectroscopy before the modification process. The Mooney value for the polymer was determined before and after modification.

EXAMPLE 1 TO 6

Commercially obtainable styrene-butadiene copolymers and butadiene rubbers from Bayer AG were dissolved in hexane (isomeric mixture) and heated to 50° C. A mixture of disulfur dichloride (Merck AG) as a 0.1% solution in hexane and aluminum trichloride as a 1% solution in diethyl ether was slowly added with agitation. The polymer solution was then stirred for a further two hours and the polymer isolated by precipitating the polymer solution in ethanol with 0.5 phr BHT (2,6-di-tert-butyl-4-methylphenol) and 0.16 phr Araldite® DY 026SP (BASF AG) and the polymer dried in vacuo at 60° C.

The batch sizes, reaction conditions and properties of the polymers obtained are set out in Table 1.

TABLE 1

| | Examples 1 to 6 | | | | | |
|---|---|---|---|---|---|---|
| Example | 1 | 2 | 3 | 4 | 5 | 6 |
| Buna SL 25-0 in g | 2400 | | | | | |
| Buna VSL 2525-0 in g | | 100 | | | | |
| Buna VSL 2525-0 in g | | | 100 | | | |
| Buna VSL 5025-0 in g | | | | 2400 | | |
| Buna VI 47-0 in g | | | | | 100 | |
| Buna CB 10 in g | | | | | | 2400 |
| Hexane in g | 1360 | 570 | 570 | 1360 | 570 | 1360 |
| Modification | | | | | | |
| $S_2Cl_2$ in g | 3 | 0.1 | 0.1 | 9 | 0.1 | 3 |
| $AlCl_3$ in g | 15 | 0 | 0.2 | 15 | 0.2 | 15 |
| Polymers | | | | | | |
| Styrene content in wt. % | 29.0 | 26.3 | 26.3 | 23.6 | 0 | 0 |
| Butadiene content in wt. % | 71.0 | 73.7 | 73.7 | 76.4 | 100 | 100 |
| cis in % | 23.1 | 19.2 | 19.2 | 11.6 | 17.9 | 97.9 |
| trans in % | 39.5 | 31.8 | 31.8 | 15.7 | 29.5 | 0.9 |
| 1,2 in % | 8.4 | 22.7 | 22.7 | 49.1 | 52.6 | 1.2 |
| $ML_{1+4}$(100° C.) before reaction | 50 | 51 | 51 | 50 | 48 | 44 |
| $ML_{1+4}$(100° C.) after reaction | 65 | 51 | 68 | 94 | 77 | 61 |

The Buna rubbers used are commercial products from Bayer AG, the names of which are registered as trademarks.

EXAMPLE 7 TO 9

The polymerizations were performed with exclusion of air and moisture in a nitrogen atmosphere.

The polymerization was performed in a 20 liter Buichi steel autoclave with a stirrer and heated jacket. The quantities specified in Table 2 of styrene, 1,3-butadiene, hexane (isomer mixture), initiator solution (n-butyl lithium in n-hexane), potassium tert-amylate (KTA) as alkali metal alcoholate and diethoxyethane (DEE) as modifier were added under nitrogen. The temperature was adjusted to 60° C. After it had achieved full conversion (approx. 2 h), the polymer was short-stopped with ethanol (Example 7). A mixture of disulfur dichloride as a 0.1% solution in hexane and aluminum trichloride as a 1% solution in diethyl ether was slowly added to the short-stopped (Example 7) or living (Examples 8 and 9) polymer solution with agitation. After a contact time of 2.5 h at 50° C., the modified polymer was isolated by precipitating the polymer solution in ethanol with 0.5 phr BHT (2,6-di-tert-butyl-4-methylphenol) and 0.16 phr Araldite® DY 026SP and dried to constant weight in a vacuum drying oven at 60° C.

The batch sizes, reaction conditions and properties of the polymers obtained are stated in Table 2.

TABLE 2

| | Examples 7 to 9 | | |
|---|---|---|---|
| Example | 7 | 8 | 9 |
| Polymerization | | | |
| BuLi in mmol | 10 | 10.35 | 10.5 |
| Hexane in g | 8500 | 8500 | 8500 |
| Styrene in g | 375 | 375 | 300 |
| 1,3-butadiene in g | 1125 | 1125 | 1200 |
| KTA in mmol | 0.565 | 0.565 | 0.565 |
| DEE in mmol | 3.9 | 3.9 | 18 |
| Modification | | | |
| Ethanol in mmol | 15 | — | — |
| $S_2Cl_2$ in g | 1.39 | 0.39 | 0.38 |
| $AlCl_3$ in g | 6.94 | 1.95 | 1.88 |
| Polymers | | | |
| Styrene content in wt. % | 25.5 | 26.0 | 18.8 |
| Butadiene content in wt. % | 74.5 | 74.0 | 81.2 |
| cis in % | 19.3 | 18.8 | 13.0 |
| trans in % | 30.9 | 31.1 | 17.9 |
| 1,2 in % | 24.3 | 24.1 | 50.3 |
| $ML_{1+4}$(100° C.) before reaction | 44 | 38 | 42 |
| $ML_{1+4}$(100° C.) after reaction | 52 | 51 | 54 |

The polymers produced in Examples 1, 4 and 6 were used in conventional carbon black mixtures:

TABLE 3

| Polymer* | 100 |
|---|---|
| Carbon black N-234 (Degussa-Hüls) | 50 |
| Oil Enerthene 1849-1 (BP) | 5 |
| Zinc oxide RS (Degrillo) | 3 |
| Stearic acid (Henkel KG) | 2 |
| Antilux 654 (Rhein Chemie) | 1.5 |
| Vulkanox HS (Bayer) | 1 |
| Vulkanox 4020 (Bayer) | 1 |
| Vulkacit CZ (Bayer) | 1.4 |
| Vulkacit D (Bayer) | 0.3 |
| Sulfur (Solvey) | 1.8 |

*Buna CB 10, SL 25-0, VSL 5025-0: commercial products from Bayer

The rubber is placed in a GK 1.5 mixing compounder and kneaded for 30 seconds at a speed of 55 rpm and a starting temperature of 60° C. Carbon black, oil, zinc oxide, stearic acid and antioxidant are added at constant speed and kneaded for a further 2 minutes. After allowing the mold to breathe for a short time, the mixture is kneaded for a further 1.5 minutes (for a total mixing time of 4 minutes) or 7.5 minutes (for a total mixing time of 10 minutes). Sulfur and accelerator are incorporated on the roll at 40° C. for approx. 5 minutes until the sheeted out compound is homogeneous.

The mixtures were mixed in the compounder for 4 minutes or 10 minutes respectively. The following Mooney values were obtained for the products:

TABLE 4

| Example | 10 | 11 | 12 | 13 | 14 | 15 |
|---|---|---|---|---|---|---|
| Polymer | Buna SL 25-0 | From Example 1 | Buna CB 10 | From Example 6 | Buna VSL 5025-0 | From Example 4 |
| ML 1 + 4, 10 min. | 65.0 | 72.4 | 82.8 | 92.0 | 65.3 | 72.3 |
| ML 1 + 4, 4 min. | 61.7 | 67.7 | 76.4 | 79.5 | 62.0 | 68.6 |
| Difference | 3.3 | 4.7 | 6.4 | 12.5 | 3.3 | 3.7 |

It was found that the modified polymers demonstrate a greater drop in Mooney viscosity than the non-modified products, i.e., the processability has improved. This selective masticating effect offers the substantial advantage that, similarly to natural rubber, improved incorporation and improved dispersion of the fillers and rubber chemicals is guaranteed.

TABLE 5

| Example | DIN standard | 10 | 11 | 12 | 13 | 14 | 15 |
|---|---|---|---|---|---|---|---|
| H23 (Shore A) | DIN 53505 | 68 | 72 | 70 | 71 | 73 | 75 |
| H70 (Shore A) | DIN 53505 | 64 | 66 | 68 | 69 | 65 | 70 |
| E70 (%) | DIN 53512 | 50 | 51 | 61 | 63 | 43 | 44 |
| tan δ, 60° C. | DIN 53513 | 0.147 | 0.136 | 0.121 | 0.113 | 0.167 | 0.161 |

Application-related data was determined from the test pieces. It is evident from Table 5 that with comparable hardness values, after modification according to the invention, the values for E70 increase and the values for tan delta (60° C.) fall, which experts associate with lower rolling resistance.

EXAMPLES 16 TO 21

The polymers produced in Examples 1, 4 and 6 were used in conventional silica mixtures:

TABLE 6

| Polymer | 100 |
|---|---|
| Vulkasil S (Bayer) | 70 |
| Silane Si 69 (Degussa Hüls) | 6 |
| Carbon black N 121 (Degussa Hüls) | 10 |
| Enerthene 1849-1 (BP) | 30 |
| ZnO RS (Degrillo) | 3 |
| Stearic acid (Henkel) | 1 |
| Antilux 654 (Rhein-Chemie) | 1 |
| Vulkanox HS (Bayer) | 1.5 |
| Vulkanox 4020 (Bayer) | 1.5 |
| Vulkacit CZ (Bayer) | 1.4 |
| Vulkacit D (Bayer) | 2 |
| Sulfur (Solvey) | 1.6 |

The rubber is placed in a GK 1.5 mixing compounder and kneaded for 30 seconds at 60 rpm and a starting temperature of 80° C. 50% Vulkasil and 50% silane Si69 are added at constant speed and mixed for 1 minute. The remaining Vulkasil, Si69, carbon black and oil are then added and mixed for a further minute.

Zinc oxide, stearic acid and antioxidant are then added and again mixed for 1 minute. After allowing the mold to breathe for a short time, the mixture is kneaded for a further 1 minute. Total mixing time 4.5 minutes.

Sulfur and accelerator are incorporated on the roll at 40° C. for approx. 5 minutes until the sheeted out compound is homogeneous.

TABLE 7

| Example | | 16 | 17 | 18 | 19 | 20 | 21 |
|---|---|---|---|---|---|---|---|
| Polymer | | Buna SL 25-0 | Example 1 | Buna CB 10 | Example 6 | Buna VSL 5025-0 | Example 4 |
| F (MPa) | DIN 53504 | 19.1 | 21.6 | 16.9 | 18.4 | 15.4 | 16.0 |
| M 100 | DIN 53504 | 2.8 | 3.0 | 2.5 | 2.7 | 5.0 | 5.3 |
| H23 (Shore A) | DIN 53505 | 73 | 74 | 70 | 74 | 76 | 81 |
| H70 (Shore A) | DIN 53505 | 69 | 70 | 70 | 70 | 74 | 75 |

Application-related data was determined from the test pieces. In silica mixtures, too, improvements in the mechanical properties are to be observed with comparable hardness values. In this way, the known deficiencies associated with silica mixtures can be improved.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for the production of copolymers based on vinyl aromatic compounds and conjugated dienes, wherein after the step of polymerization, said vinyl aromatic diene copolymers are treated with multi-functional sulfur halides in the presence of a catalyst at temperatures in the range from 20 to 130° C., wherein said catalyst is a Lewis acid or a tert-amine.

2. A method according to claim 1, wherein said multi-functional sulfur halides are selected from the group consisting of disulfur dichloride, sulfur dichloride, thionyl chloride, polysulfur dichloride, disulfur dibromide and/or polysulfur dibromide.

3. A method according to claim 2, wherein said multi-functional sulfur halide is disulfur dichloride.

4. A method according to claim 1, wherein said multi-functional sulfur halides are used in quantities of 0.005 to 5.0 wt. % relative to the mass of the copolymer.

5. A rubber molding comprising vinyl aromatic diene copolymers treated with multi-functional sulfur halides in the presence of a catalyst at temperatures in the range from 20 to 130° C., wherein said catalyst is a Lewis acid or a tert-amine.

6. A rubber molding according to claim 5, wherein said rubber molding is a tire component.

7. A method according to claim 1, wherein said Lewis acid is selected from the group consisting of boron trifluoride, zinc dichloride, triethyl aluminum, aluminum trichloride, aluminum tribromide, tin tetrachloride and titanium tetrachloride.

8. A method according to claim 1, wherein said tert-amine is selected from the group consisting of diisopropyl ethylamine, diazabicycloundecane and triethylamine.

9. A rubber molding according to claim 5, wherein said Lewis acid is selected from the group consisting of boron trifluoride, zinc dichloride, triethyl aluminum, aluminum trichloride, aluminum tribromide, tin tetrachloride and titanium tetrachloride.

10. A rubber molding according to claim 5, wherein said tert-amine is selected from the group consisting of diisopropyl ethylamine, diazabicycloundecane and triethylamine.

* * * * *